3,094,369
PROCESS FOR PRINTING OF TEXTILE MATERIAL

Hugo Bartl and Erich Feess, Frankfurt am Main, Germany, assignors to Farbwerke Hoechst Aktiengesellschaft vormals Meister Lucius & Brüning, Frankfurt am Main, Germany, a company of Germany No Drawing. Filed June 28, 1960, Ser. No. 39,215
Claims priority, application Germany July 4, 1959
7 Claims. (Cl. 8—65)

It is known that pads of sulfuric acid esters of leuco vat dyestuffs which contain such chemical agents as are conventionally used in the so-called "chlorate steaming process," namely an oxidizing agent, an acid donator and an oxygen carrier, can, after drying, by printing with a printing paste containing in addition to alkali and a reducing agent, if desired, also vat dyestuffs, be resisted in white or, if desired, in colours. In general, the white and coloured effects obtained in this manner are satisfactory. However, the disadvantage of the process is that the padded goods must be dried very carefully to prevent the sulfuric acid ester from partly developing into a vat dyestuff which would thus impair the purity of the resulting resists. For this reason the padded goods can only be stored for a limited period. The process is, therefore, considered to be unsatisfactory in practice.

It is also known that pad dyeings made with sulfuric acid esters of leuco vat dyestuffs that contain sodium nitrite can be resisted in light shades by overprinting them with printing pastes which contain normal vat dyestuffs. In this process, the vat dyestuff is developed by the action of hot dilute sulfuric acid for a short period, after the steaming process. With fuller shades, however, the white and coloured resists are more or less dulled. Pad dyeings that contain chromate instead of nitrite exhibit the same disadvantage.

Even the first-print processes have proved to be unsatisfactory, since after printing with the resist dyestuffs and steaming it is necessary to pad over the goods with the solution of sulfuric acid esters of leuco vat dyestuffs and to develop them as soon as possible. This process does not make allowances for correcting the dyeings because the resist dyestuffs are printed first. Another disadvantage is that it is necessary to treat the printed goods immediately after they have been printed and this is incompatible with the desire to rational methods of operation, as for example when it is desired to collect several pieces of the same patern for one bottom dyeing. Furthermore, in obtaining deeper shades, the dyestuff take-up is affected because usually no steaming process is carried out.

The present invention is based on the observation that white and coloured resists on cellulose fabrics with vat dyestuffs on pad dyeings made with sulfuric acid esters of leuco vat dyestuffs and sodium nitrite can be prepared in a simple manner if as resisting agents there are used addition products of aldehydes or ketones and alkali metal sulfoxylates and of compounds containing amino or imino group, in which the nitrogen atom of the amino or imino group is bound to at least one aromatic or heterocyclic radical or to a further $NH_2$-group or to a $NH_2$-group substituted by an aromatic or heterocyclic radical.

Generally, the addition products contain one molecular proportion of aldehyde or ketone and one molecular proportion of alkali metal sulfoxylate for one amino or imino group. If the nitrogen-containing compounds contain more than one amino or imino group, for example 2 amino groups, there may be obtained addition products of which only one amino group adds on one molecular proportion of aldehyde and one molecular proportion of alkali metal sulfoxylate as well as such of which each of the two amino groups adds on one molecular proportion each of aldehyde and of alkali metal sulfoxylate.

As aldehydes or ketones there come into consideration compounds of the aliphatic, cycloaliphatic, aromatic and heterocyclic series. The first members of the said series are particularly suitable. There may, for example, be mentioned: Formaldehyde, acetaldehyde, benzaldehyde, furaldehyde, acetone, methylethyl ketone, cyclohexanone, acetophenone, benzophenone, and others.

As compounds containing amino or imino groups there come into consideration compounds in which the amino or imino group is bound to at least one aromatic or heterocyclic radical. There may also be used compounds in which the amino or imino group is linked to a further $NH_2$-group substituted by an aromatic or heterocyclic radical. Hydrazine is likewise suitable for the process of the present invention. In detail there may further be mentioned the following compounds: Phenyl-hydrazine, aniline, ortho- and para-phenylene-diamine, para-amino-phenyl-glycine, para-methoxy-phenyl-glycine, anthranilic acid and the like. Particularly favorable results are obtained with the addition product of one molecular proportion of sodium formaldehyde sulfoxylate on anthranilic acid.

When using the said addition products for the preparation of white resists on fabrics padded with sulfuric acid esters of leuco vat dyestuffs and sodium nitrite, the fabric is printed with a printing paste either containing the finished addition product or the single components, that is to say aldehyde or ketone, alkali metal sulfoxylate and the suitable compound containing amino- or imino-groups. After intermediate drying the printed fabric is developed by means of dilute sulfuric acid, if desired with addition of nitrite. Between the drying process and the development a steaming process can be intercalated whereby in some cases the purity of the white effect and the dyestuff take-up of the dyeing is improved.

However, it is also possible first to print the printing paste on the fabric, that is to say to operate according to the aforementioned first-print resist process. According to this process the fabric is impregnated, after printing and drying, with the solution of the sulfuric acid ester of the leuco vat dyestuff, that is to say it is padded or nip-padded and directly or after an intermediate drying developed in usual manner with hot dilute sulfuric acid, rinsed, soaped, rinsed again and dried.

In the preparation of coloured resists the addition products of the present invention are added to the vat dyestuff pastes. The padded and dried fabric is then printed and dried once more. The quantity to be applied of the addition product varies according to the type of the sulfuric acid ester of the leuco vat dyestuff, according to the depth of the desired shade and to the purity of the effect, between about 20 and about 200 grams. After printing and drying the fabric is steamed for 3–15 minutes and further treated in the usual manner in order to develop the leuco vat dyestuff. In the preparation of coloured resists it is also possible to proceed as follows: The fabric is first printed with the printing paste, dried, steamed, dried again if desired, padded with the solution of the sulfuric acid ester of the leuco vat dyestuff and of sodium nitrite or nip-padded and then developed in the usual manner by means of dilute hot sulfuric acid. Particularly, when full shades shall be obtained it is of advantage to dry the fabric between padding or nip-padding and developing. Also when preparing coloured resists there may be added, instead of the finished addition product, its single components.

If to the printing pastes there are added the single components, that is to say aldehyde or ketone, alkali metal sulfoxylate and a compound containing amino- or imino-groups the addition compound is formed on standing of the printing pastes and on drying of the prints. In view of the fact that the vat dyestuff printing paste normally contains sodium formaldehyde sulfoxylate it must be considered that upon addition of the components containing amino or imino groups to the printing paste alone the addition compound is formed whereby in the case of older printing pastes the dyestuff take-up of the vat dyestuff is reduced unless sufficient formaldehyde sulfoxylate is present for vatting the vat dyestuff on the one hand and for forming the addition compound on the other hand.

The advantages of the use of the described addition compound for the preparation of white and coloured resists as compared with the hitherto known processes resides in the purity of the resist effects irrespective of the fact whether or not a steaming process is intercalated. In this respect it makes no difference whether the printing is carried out on the fabric previously padded or nip-padded with the sulfuric acid esters of leuco vat dyestuffs and sodium nitrite and dried or whether the printing is effected prior to the padding or dyeing process. Thus, there are many possibilities for application of the process of the present invention. The compounds may be used for the so-called print and first-print resist process as well as for white resists and as addition to colour resists. In the case of colour resists the formation of sulfuric acid esters of leuco vat dyestuffs is prevented so that in spite of the steaming process required for the fixation of the vat dyestuff a purer coloured effect is obtained than when using the hitherto applied normal vat dyestuff pastes which are sensitive to steaming insofar as, although with prolonged steaming time the depth of shade of the vat dyestuff is increased, the resisting power of the printing paste diminishes whereby the coloured effects are dulled by sulfuric acid esters of leuco vat dyestuffs being also formed in the printed parts. The vat dyestuff printing pastes of the present invention are almost insensitive to the steaming process.

The following examples illustrate the invention:

Example 1

A cotton fabric was padded with a solution containing per liter:

20 grams of the sodium salt of the sulfuric acid ester of the leuco form of the 2-(4-chloro-naphthalene)-2'-(4'-methyl-5'-chloro-7'-methoxy-indol)indigo
15 grams of sodium nitrite and
3 grams of soda ash The fabric was squeezed and dried at 80° C. It was then dried with a printing paste containing per kilogram:

100 grams of sodium anthranilo-N-methylene-sulfoxylate
700 grams of neutral starch/tragacanth thickening and
150 grams of water The fabric was then dried and steamed for 7½ minutes. By dipping into hot (70° C.) sulfuric acid of 1% strength there were obtained in the printed parts white effects on a blue base. The fabric was then washed, as usual, with a soda alkaline solution and dried. It is not absolutely necessary to steam the dried fabric after drying; it is also possible to subject the fabric directly to the sulfuric acid treatment.

Example 2

A fabric of staple fibre was padded with a solution containing per liter:

10 grams of the sodium salt of the sulfuric acid ester of the leuco form of the dibenzopyrene-quinone
10 grams of sodium nitrite and
3 grams of soda ash The fabric was then squeezed, dried and printed with a paste containing per kilogram of printing paste:

70 grams of anthranilic acid
75 grams of sodium formaldehyde sulfoxylate
700 grams of starch/tragacanth thickening and
155 grams of water The printing paste may, in addition, be admixed with sodium carbonate.

The printed fabric was treated in the manner described in Example 1, whereby there were obtained white effects on a golden-yellow base.

Example 3

A fabric of viscose rayon was padded with a solution containing per liter:

20 grams of the sodium salt of the sulfuric acid ester of the leuco form of the 2-acenaphthene-2-thionaphthene-indigo
10 grams of sodium nitrite and
3 grams of soda ash The dried fabric was printed with a printing paste containing per kilogram:

20 grams of dibenzopyrene-quinone
70 grams of sodium formaldehyde sulfoxylate
120 grams of soda ash
75 grams of sodium anthanilo-N-methylene-sulfoxylate
600 grams of starch/tragacanth thickening and
115 grams of water After the drying the fabric was steamed for 10 minutes and dried once more for a short time.

By further treating the fabric as described in Example 1, there were obtained yellow effects on a red base.

Example 4

A cotton fabric was padded with a solution containing per liter:

20 grams of the sodium salt of the sulfuric acid ester of the leuco form of the 2-(4-chloronaphthalene)-2'-(4'-methyl-5'-chloro-7'-methoxy-indol)-indigo
15 grams of sodium nitrite and
3 grams of soda ash The fabric was squeezed and dried at 80° C.

The pretreated goods were printed with a printing paste which contained per kilogram:

20 grams of 2-acenaphthene-2-thionaphthene-indigo
70 grams of sodium formaldehyde sulfoxylate
70 grams of soda ash
100 grams of starch/tragacanth thickening and
740 grams of a stock thickening consisting per kilogram of
650 grams of starch/tragacanth thickening
195 grams of sodium formaldehyde sulfoxylate solution (1:1 in water)
90 grams of anthranilic acid and
65 grams of sodium hydroxide solution of 38° Bé.

and which should stand for some time prior to being used for printing.

Instead of anthranilic acid corresponding equivalent quantities of ortho- or para-phenylene-diamine, para-amino-phenyl-glycine, para-methoxy-phenyl-glycine, phenyl-hydrazine or aniline could have been used.

When further treating the prints in the manner described in Example 3, there were obtained red effects on a blue base.

We claim:
1. In a process for producing white and colored resists on pads made on cellulosic fabrics with leucosulfuric acid esters of vat dyestuffs and salts of nitrous acid, the improvement which comprises treating said fabric with a resisting agent consisting essentially of an addi- tion product of (A) an alkali metal sulfoxylate, (B) a compound of the formula $$R_1-\underset{\underset{O}{\|}}{C}-R_2$$

wherein $R_1$ stands for a member of the group consisting of hydrogen, lower alkyl and phenyl, $R_2$ stands for a member of the group consisting of hydrogen, lower alkyl, phenyl and furyl, and $R_1$ and $R_2$ together represent an alkylene group forming a cycloalkyl group with the carbonyl carbon atom, and (C) a compound of the group consisting of hydrazine, phenyl amino compounds and phenyl imino compounds, the molar amounts of components A and B being at least about equal to the molar amount of component C.

2. A process as defined in claim 1, wherein the resisting agent is an addition product of equimolar proportions of components A, B and C.

3. A process as defined in claim 1, wherein component B is an aldehyde and the molar amounts of components A and B per mol of component C are approximately equal to the number of nitrogen atoms in a molecule of component C.

4. A process as defined in claim 1, wherein component B is a ketone and the molar amounts of components A and B per mol of component C are approximately equal to the number of nitrogen atoms in a molecule of component C.

5. A process as claimed in claim 1, wherein sodium anthranilo-N-methylene-sulfoxylate is used as resisting agent.

6. A process as claimed in claim 1, wherein the addition product is added to the printing paste.

7. A process as claimed in claim 1, wherein the components of the addition product are individually added to the printing paste.

References Cited in the file of this patent
UNITED STATES PATENTS 2,895,785     Alsberg et al. _____ July 21, 1959
2,970,880     Kaplan _____ Feb. 7, 1961